United States Patent
Bormann et al.

(10) Patent No.: US 6,802,018 B2
(45) Date of Patent: Oct. 5, 2004

(54) METHOD AND APPARATUS TO DIRECTLY ACCESS A PERIPHERAL DEVICE WHEN CENTRAL PROCESSOR OPERATIONS ARE SUSPENDED

(75) Inventors: David Bormann, Sunnyvale, CA (US); Leslie E. Cline, Sunnyvale, CA (US); Frank Hart, Apex, NC (US); Rudi Rughoonundon, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 09/748,921

(22) Filed: Dec. 27, 2000

(65) Prior Publication Data

US 2002/0116554 A1 Aug. 22, 2002

(51) Int. Cl.[7] .................................................. G06F 1/26
(52) U.S. Cl. ...................... 713/324; 713/300; 713/323; 710/36; 710/38
(58) Field of Search ................................ 713/300, 310, 713/320, 322, 323, 324, 340; 710/36, 38, 305, 308, 309, 310

(56) References Cited

U.S. PATENT DOCUMENTS

| | | | | |
|---|---|---|---|---|
| 5,848,281 A | * | 12/1998 | Smalley et al. | 713/322 |
| 6,128,747 A | * | 10/2000 | Thoulon | 713/330 |
| 6,148,357 A | * | 11/2000 | Gulick et al. | 710/309 |
| 6,351,818 B1 | * | 2/2002 | Murai | 713/300 |
| 6,477,655 B1 | * | 11/2002 | Delvaux et al. | 713/323 |
| 6,606,712 B1 | * | 8/2003 | Miura | 713/320 |
| 6,633,988 B2 | * | 10/2003 | Watts et al. | 713/322 |

FOREIGN PATENT DOCUMENTS

| JP | 08044615 A | * | 2/1996 | G06F/12/00 |
|---|---|---|---|---|

OTHER PUBLICATIONS

Heuring, V.P. and Jordan, H. F.; "Computer Systems Design and Architecture"; 1997; Addisson Wesley Longman, Inc.; pages(s): 399–400.*

* cited by examiner

*Primary Examiner*—Lynne H. Browne
*Assistant Examiner*—James K. Trujillo
(74) *Attorney, Agent, or Firm*—Blakely, Sokoloff, Taylor & Zafman LLP (57) ABSTRACT

A method and apparatus for facilitating direct access to computer resources by a peripheral device while the computer's CPU is in a sleeping state. A peripheral device having a circuit to detect the power management state of a central processor, a first interface to couple the device to the central processor if the circuit detects the first power management state, and a second interface to couple the device to a peripheral device if the circuit detects the second power management state.

35 Claims, 7 Drawing Sheets

METHOD AND APPARATUS TO DIRECTLY ACCESS A PERIPHERAL DEVICE WHEN CENTRAL PROCESSOR OPERATIONS ARE SUSPENDED

Field

The present invention relates generally to a method and apparatus to allow a computer system to receive information while the CPU is in a sleeping state, and more particularly to a first peripheral device with multiple modes of operation to receive, buffer, and process data, including directly accessing a second peripheral device, while the computer's CPU is in a sleeping or suspended state.

BACKGROUND OF THE INVENTION

As mobile computing devices seek to extend time-of-operation between charges, power management has become increasingly important. One way in which power management is accomplished is by completely, or partially, shutting down computer components, such as the central processing unit (CPU), hard disk drive, display, and other input/output (I/O) devices: when the computer is not performing operations.

During some of these power management modes, also known as sleeping states, the computer's CPU may cease communications with and control of its peripheral resources, including I/O components, and those resources may not be accessed by any other computer component. Such power management techniques are not unique to any one computer system architecture.

One hardware system specification, the Advanced Configuration and Power Interface (ACPI) Specification, by Intel, Microsoft, and Toshiba, Revision 1.0b, Feb. 2, 1999, provides a technique for enhancing power management in a personal computer (PC) system architecture. The ACPI specification describes the transfer of power management functions from the Basic Input/Output System (BIOS) to the operating system, thereby enabling demand-based peripheral and power management. Through the application of this specification, PC computers manage power usage of peripheral devices such as CD-ROMs, network cards, hard disk drives, audio codecs, and printers, as well as consumer electronics connected to a PC, such as video cassette recorders, television sets, telephones, and stereos.

As shown in the table below, the ACPI specification defines several low-power sleeping states, S1–S5, that reduce the power consumed by the CPU by limiting the operations it may perform. S0 is herein used as an indicator of 'no sleeping state'. These various operating states are herein referred to as power management states. 'Context', refers to variable data held by the CPU and other computer devices. It is usually volatile and can be lost when entering or leaving certain sleeping states.

Sleeping Description

States

S0 Normal operation, active state.

S1 The S1 sleeping state is a low wake-up latency sleeping state. In this state, no system context is lost (CPU or chip set) and hardware maintains all system context.

S2 The S2 sleeping state is a low wake-up latency sleeping state. This state is similar to the S1 sleeping state except the CPU and system cache context is lost (the OS is responsible for maintaining the caches and CPU context). Control starts from the processor's reset vector after the wake-up event.

S3 The S3 sleeping state is a low wake-up latency sleeping state where all system context is lost except system memory. CPU, cache, and chip set context are lost in this state. Hardware maintains memory context and restores some CPU and L2 configuration context. Control starts from the processor's reset vector after the wake-up event.

S4 The S4 sleeping state is the lowest power, longest wake-up latency sleeping state supported by ACPI. In order to reduce power to a minimum, it is assumed that the hardware platform has powered off all devices. A copy of the platform context is written to the hard disk.

S5 The S5 state is similar to the S4 state except the OS does not save any context nor enable any devices to wake the system. The system is in the "soft" off state and requires a complete boot when awakened.

Typically, in the PC computing architecture, data may only be transferred between two peripheral devices by having the host operating system manage such transfer. That is, the CPU, through one of its auxiliary components, must control the data flow to and from peripheral devices.

Figure 1:
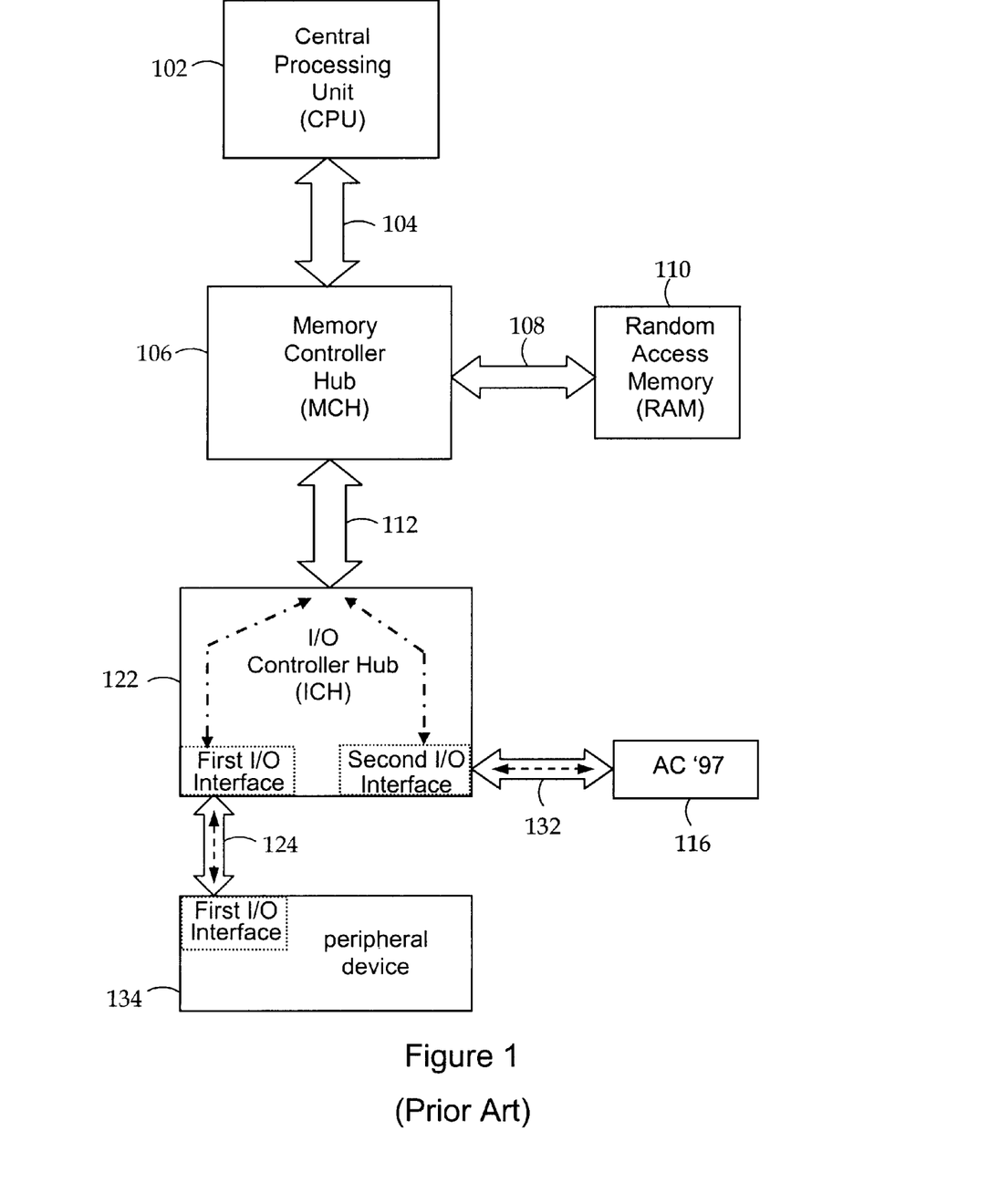
FIG. 1 is a system-level diagram of a conventional PC architecture.

FIG. 1 is a conventional, system-level diagram of relevant components of the PC computing architecture. In this architecture, the I/O Controller Hub (ICH) 122 manages communications to and from peripheral devices 116, 118, 134 by controlling data flow to the Memory Controller Hub (MCH) 106. The bus between the ICH 122 and MCH 106 is known as the Hub Link bus 112. The MCH 106 may store data received from the ICH 122 in memory (RAM) 110 and the CPU 102 may access such data via the MCH 106.

The ICH 122 communicates with various peripheral devices and I/O components via standard buses or interfaces. Typically, the ICH 122 acts as the "master", controlling the communication, and the peripheral device as the "slave", responding to the ICH's 122 commands. One peripheral device is a hard disk drive (HDD) 118, which may be connected to the ICH 122 via an Integrated Drive Electronics (IDE) or Extended IDE (EIDE) interface 120. The ICH 122 may also communicate with a codec (AC '97) 116 through the AC '97 Link 132. Other peripheral devices may also be interfaced with the ICH 122 through such interfaces as a Peripheral Component Interconnect (PCI), Universal Serial Bus (USB), RS-232 serial port, or parallel port.

Regardless of the interface or peripheral device, the ICH 122 routes data, indicated by the dashed bidirectional lines, between said interface or device and the MCH 106 as indicated in FIG. 1. The host computer's operating system (OS) acts as the Hub Link bus master when the CPU 102 is not in a sleeping state. When the CPU 102 is in sleeping states S3–S5, the Hub Link bus 112 is not usually operable. That is, while the CPU 102 is in these sleeping states, its resources are often unavailable and communications with the computer and its peripheral devices is not generally possible without awakening the CPU 102. Currently, the ICH 122 is designed with a single Hub Link interface and can handle only one default bus master. In order to comply with existing standards, it is desirable to avoid changing the ICH 122 architecture.

One increasingly common peripheral component in mobile computers is a mobile communications device compatible with the Bluetooth Specification. The Bluetooth Specification, v. 1.0B, Dec. 1, 1999, is a communications standard for wireless communications between mobile PCs, mobile phones, and other portable devices. This standard makes possible the interconnection of a wide range of computing and telecommunications devices via ad hoc, short-range radio links. Presently, most computers utilize external I/O devices to serve as Bluetooth-compliant transceivers. These devices are often connected to a computer via a Universal Serial Bus (USB) port or some other standard I/O interface. They also rely on the computers'CPU 102 to process the messages received and store them in memory 110. Therefore, these Bluetooth-compliant transceivers would not be able to operate during those times when the computers'CPU 102 is in a sleeping state. However, keeping the CPU 102 powered just to enable the connectivity of Bluetooth compliant devices is wasteful of the limited power available to mobile computers.

The Audio Codec '97 (AC '97) is a computer component which provides analog and digital audio processing functions. The AC '97 Specification was announced Jun. 12, 1996 by co-developers Analog Devices, Inc., Creative Labs, Inc., Intel Corp., National Semiconductor Corp. and Yamaha Corp. An AC '97 component is generally mounted on a host computer's motherboard. On the PC computing architecture, shown in FIG. 1, the AC '97 116 is a peripheral device coupled to the ICH 122. "Coupled" as used herein, includes electrically coupling two or more components.

The AC '97 116 provides support functions for generating audio sounds. In some applications, the AC '97 116 may be used by other peripheral devices to convert a data stream into an identifiable audio message.

Presently, the only way PC peripheral devices, such as the AC '97 116, may be accessed is with assistance from the host operating system. That is, the CPU 102, through the Memory Controller Hub 106 and ICH 122, must control the data flow to and from peripheral devices. While the CPU 102 is in a sleeping state, its resources, including the AC '97 116, are unavailable and cannot be accessed without awakening the CPU 102 from its sleeping state.

Accordingly, there is a need for a means to directly access a peripheral device while the host system or computer's CPU is' in a sleeping or suspended power management state without disrupting that power management state. In one particular application, it is desirable to have a Bluetooth-compliant device directly access an AC '97 while the computer's CPU is in certain power management states.

DETAILED DESCRIPTION OF THE INVENTION

Figure 2A:
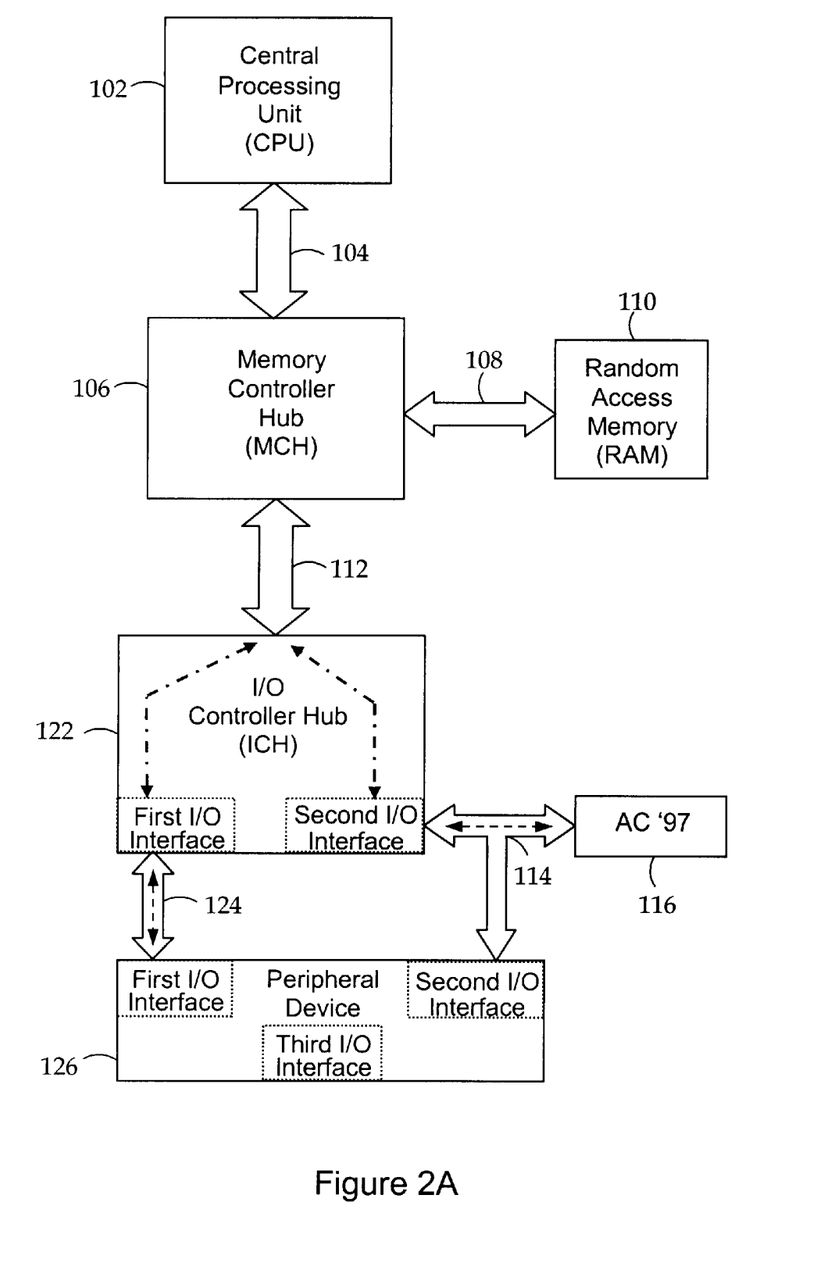
FIG. 2A is a system-level diagram illustrating data flow between PC computer components during normal operation.

FIG. 2A illustrates the present invention as used within the PC computer system architecture. However, it must be understood that the present invention-may be practiced with various other platforms, system architectures, and/or device configurations. This invention provides a tri-state bus 114 between the ICH 122, the Peripheral Device 126, and the AC '97 116 which permits two forms of access depending upon the state of the CPU 102. As used hereinafter, the term "bus" comprises various ways of communicatively coupling or linking devices, including electrical cables and optical connections.

In one embodiment of the present invention, the computer's CPU 102 acts as a default bus master for the Hub Link bus 112 and the Peripheral Device 126 is in a slave mode. "Slave mode" is herein defined as an operating mode in which the Peripheral Device 126 relies on the CPU's 102 oversight to receive and transmit information. While in slave mode, the Peripheral Device 126 behaves as a conventional peripheral device by communicating with the computer or other peripheral devices by having the ICH 122 route data to the MCH 106. Typically, most peripheral devices, including the AC '97 116, rely on the ICH 122 to route data to the MCH 106. Thus, the ICH 122, controlled by the CPU 102, acts as the bus master for the AC '97 bus 114, the Peripheral Device bus 124, and the hard disk drive bus 120. The ICH 122 and MCH 106 in turn rely on the CPU 102 to manage data flow.

According to one embodiment of the invention, the Peripheral Device 126 is in slave mode when the CPU 102 is in power management states S0–S2 as defined in the ACPI specification.

From the point of view of the host computer, the Peripheral Device 126 may behave as a normal input/output (I/O) device. However, the Peripheral Device 126 is not limited to being an I/O component or peripheral device, it may be any internal or external component capable of operating as described herein. In one embodiment of the invention, the Peripheral Device 126 may be a component mounted on the same motherboard as the CPU 102.

Unlike the conventional system architecture, the ICH 122 is coupled to the AC '97 116 over a bus 114 which is also coupled to the Peripheral Device 126. This is a tri-state bus 114, which is electrically isolated from the Peripheral Device 126 when the Peripheral Device 126 is in slave mode. The tri-state bus 114 or bus, as employed in the present invention, comprises a communication medium which may be coupled to three or more devices but which may be configured to be electrically isolated from one or more of those devices.

According to one embodiment of the present invention, the bus 114 may be isolated from the Peripheral Device 126 by placing the I/O pins at the interface of the Peripheral Device 126 and bus 114 to a high impedance state.

The bus 114 may comprise six transmission lines. However, the number of lines comprising the bus 114 is not a limitation of the invention. The bus 114 may also comprise a wired-OR-bus where the lines are either pulled-up to a reference voltage or pulled-down to reference ground during periods of inactivity.

In one embodiment of the invention, the Peripheral Device 126 is a Bluetooth wireless communication component which communicates with other Bluetooth-compliant devices via a radio-link and interfaces with the host computer via the ICH 122.

Figure 2B:
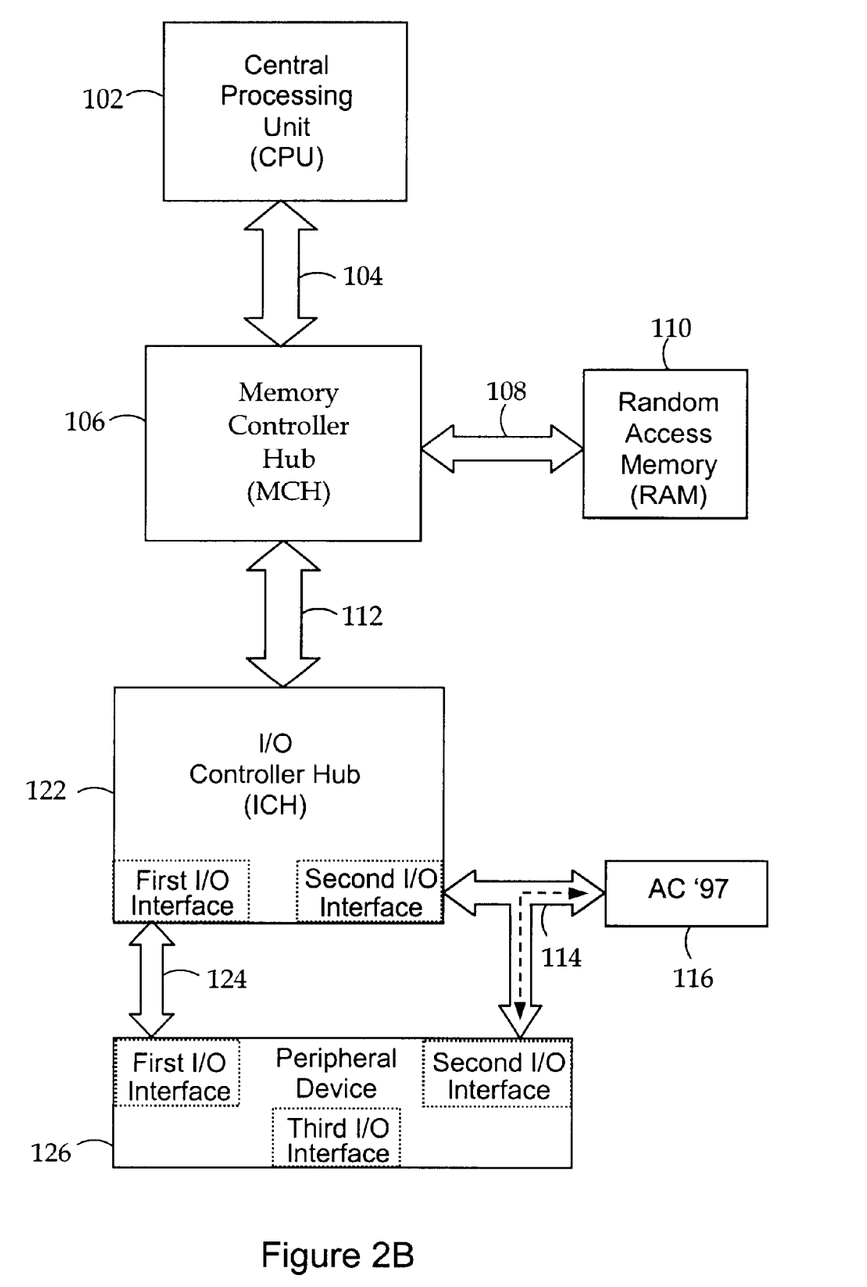
FIG. 2B is a system-level diagram illustrating data flow between a Peripheral Device of the present invention and an AC '97 when the host computer is in a sleeping state.

FIG. 2B illustrates the present invention when the CPU 102 has entered a sleeping state and is unavailable to manage communications over the ICH 122. Typically, when the CPU 102 is in certain sleeping states, peripheral devices cannot communicate with the computer or with each other because there is no master for the first Hub Link bus 112 in order for the ICH 122 to route data. When the ICH 122 is placed into certain sleeping states by the CPU 102, it is no longer able to function. The I/O pins of the ICH 122, which provide coupling to peripheral devices including the AC '97 116, are placed to high impedance to electrically isolate it from the buses which couple it to those devices. Thus, the ICH 122 is no longer the master of the AC '97 bus 114 or the Peripheral Device bus 124.

By monitoring the sleeping states, or power management states, of the CPU 102, the Peripheral Device 126 is capable to changing to master mode when the CPU 102 enters certain sleeping states. The Peripheral Device 126 may be an autonomous subsystem which may remain powered even when other peripheral devices are put to sleep or into a suspended state by the CPU 102.

The Peripheral Device 126 may detect when the CPU 102 goes into a power management state in a number of ways. In one embodiment of the present invention the Peripheral Device 126 tests the CPU's 102 control lines or hardware pins to determine when a change in the operating state has occurred. In another embodiment of the present invention, the Peripheral Device 126 may learn of the CPU's 102 change of state by receiving notification of such change from the CPU 102 itself or from a secondary component.

In master mode, the Peripheral Device 126 is capable of communicating directly with the AC '97 116 by becoming the bus master of the tri-state bus 114. This invention thus provides an alternative way of accessing an AC '97 116 without modifying the ICH 122. While FIG. 2B illustrates the use of a tri-state bus 114 to communicate with an AC '97 116 device, this is not a limitation upon the invention. Thus, a tri-state bus 114 may be utilized to allow a Peripheral Device 126 to communicate with a number of other types of devices.

Additionally, via the tri-state bus 114, the Peripheral Device 126 in master mode may be capable of awakening other peripheral devices, such as an AC '97 116, which may have been set to a sleeping state by the CPU 102.

According to one embodiment of the invention, the Peripheral Device reconfigures the tri-state bus 114 by placing the input/output pins at the interface of the Peripheral Device 126 and bus 114 to a low impedance state. Moreover, whether or not the Peripheral Device 126 remains On or becomes master when the CPU 102 is in a sleeping state, may be a configurable feature. This may be accomplished by the CPU 102, while still awake, configuring the Peripheral Device 126 to prevent it from entering master mode.

In another embodiment of the present invention, the power management states, or the set or ranges of power management states, during which the Peripheral Device 126 is in slave or master modes may vary. For instance, in one embodiment, the Peripheral Device 126 may be in slave mode during power management states S0–S2, and in master mode during power management states S3–S5, as defined in the ACPI specification. In another embodiment, the Peripheral Device 126 may be in slave mode during power management states S0–S1, and in master mode during power management states S2–S5, as defined in the ACPI specification.

Figure 3:
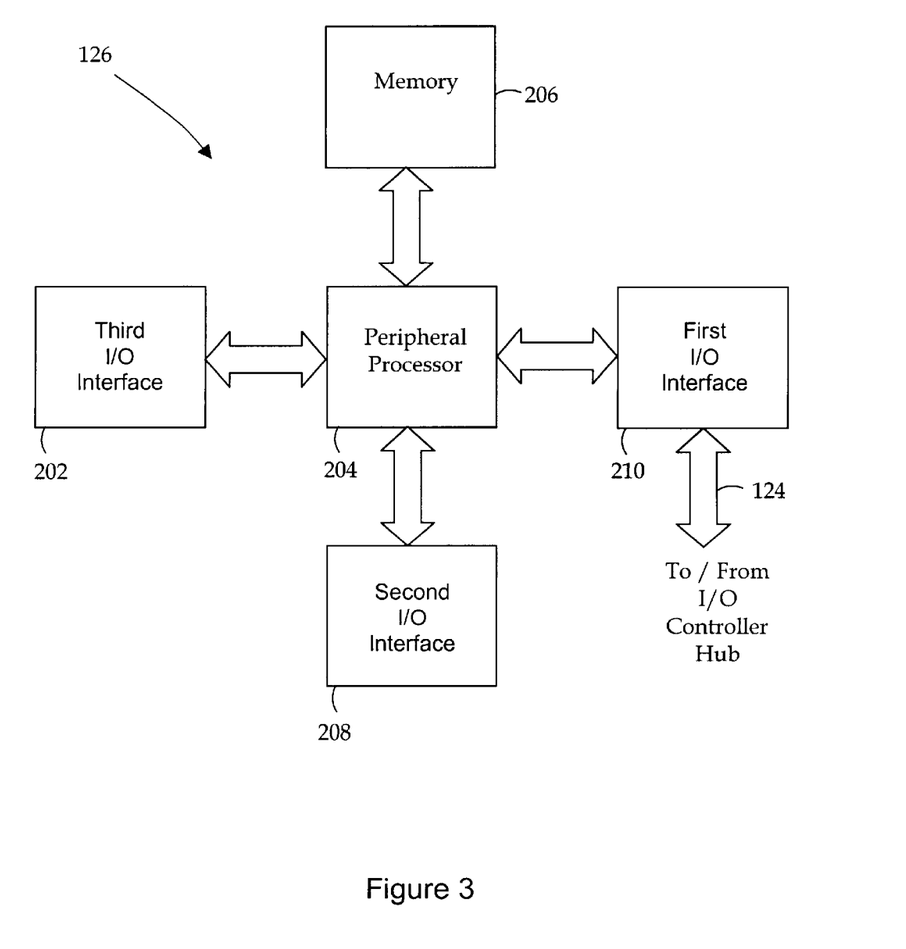
FIG. 3 is a subsystem-level diagram of one embodiment of the Peripheral Device of the present invention.

FIG. 3 is a subsystem-level view of one embodiment of a Peripheral Device 126 of the present invention. It must be noted that those components shown in FIG. 3 are not to be construed as limitations upon the invention but understood only by way of illustration.

The Peripheral Device 126 may include a Peripheral Processor 204, a memory component 206, a first input/output (I/O) interface 210, a second I/O interface 208, and a third I/O interface 202. The Peripheral Processor 204 may be capable of hosting its own operating system.

In slave mode, the Peripheral Device 126 may communicate with the computer via the first I/O interface 210. According to one embodiment of the invention, the first I/O interface 210 may comprise an I/O controller. I/O controllers are commonly utilized in inter-device communications to facilitate the transmission of data over a link or bus. Typically, I/O controllers are designed to operate in accordance with a particular hardware specification. Hence, in one embodiment of the invention, the first I/O interface (210) comprises a Universal Serial Bus (USB) controller.

In master mode, the Peripheral Device 126 may communicate with another peripheral device via a second I/O interface 208 which is coupled to a tri-state bus 114 (FIG. 2B). In one embodiment of the invention, the second I/O interface 208 comprises an AC '97 digital audio controller.

According to one embodiment of the invention, a Peripheral Device 126 in master mode may be able to store or read data to and from the memory component 206. The memory component 206 may be either internal to the Peripheral Device 126 or external to the Peripheral Device 126.

The Peripheral Device 126 may also comprise of a third I/O interface 202 through which it can receive or transmit data while the CPU 102 is in a sleeping state. In one embodiment of the invention, this third interface 202 may be a Bluetooth-compliant wireless interface. The Peripheral Device 126 may be a component mounted on the same motherboard as the computer's CPU 102.

The Peripheral Device 126 may further detect when the computer's CPU 102 is in certain sleeping states or returning from certain sleeping states. Such detection may be accomplished in a number of ways including by the Peripheral Device 126 testing the CPU's 102 control lines or hardware pins or receiving notification of such change in state from the CPU 102. If the Peripheral Device 126 is in the middle of an operation when the CPU 102 returns from a sleeping state, it can prevent the computer's CPU 102 from communicating with peripheral devices until it has finished its operation. In one embodiment of the invention, the Peripheral Device 126 may delay the CPU 102 from awakening. The Peripheral Device 126 may also have power management states, allowing it to conserve power while in master mode and not receiving or transmitting data.

Figure 4:
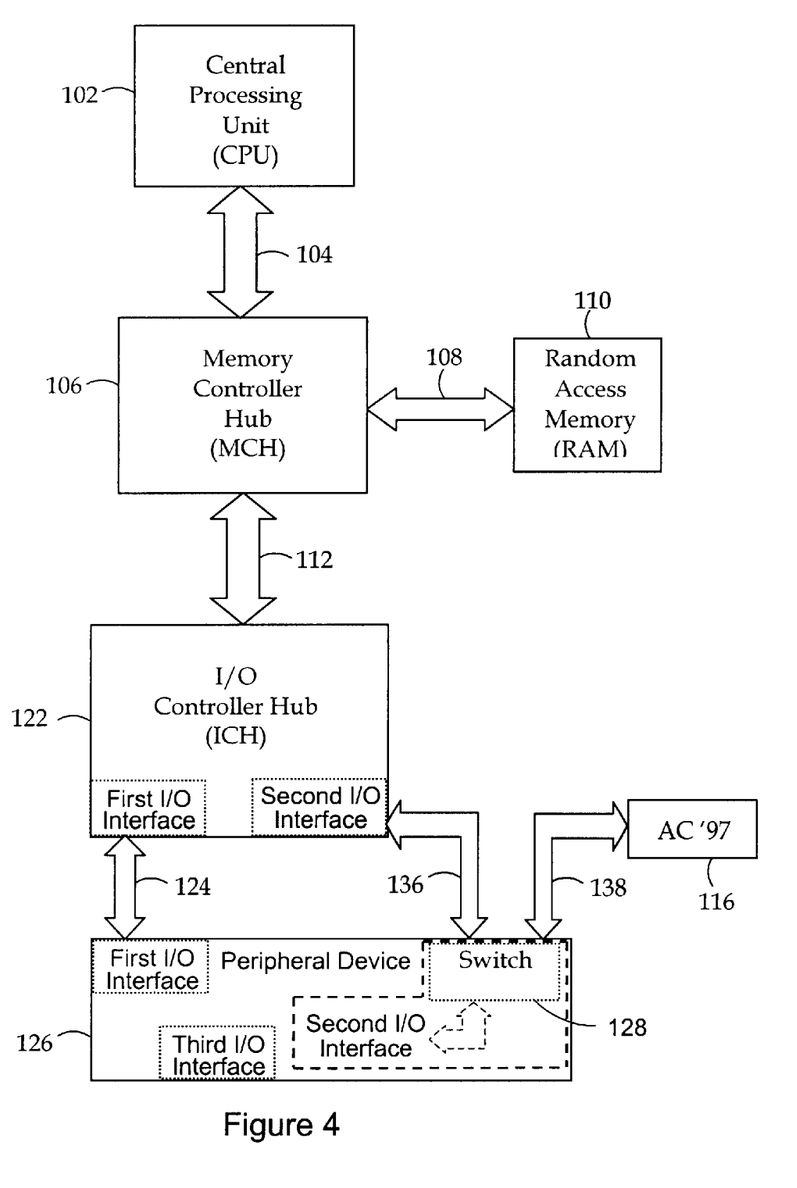
FIG. 4 is a system-level diagram illustrating an alternative embodiment of the present invention.

FIG. 4 illustrate an alternative embodiment of the present invention where a switch 128, part of the second I/O interface 208 (FIG. 4), is employed to enable the interconnection of an ICH 122, a Peripheral Device 126, and an AC '97 116. When the CPU 102 is not in a sleeping state, the ICH 122 is electrically coupled to the AC '97 116 via the switch 128. During this state, the switch 128 electrically isolates the second I/O interface of the Peripheral Device from the AC '97 bus 138.

The switch 128 may comprise any switch or device which is capable of selectively and communicatively coupling a first node to one or more conductive nodes. In various embodiments of the present invention, the switch 128 may be a crossover switch, an A/B switch, a crossbar switch, or various other switches.

When the CPU 102 is in certain sleeping states, the ICH 122 is electrically isolated from the AC '97 bus 138 by the switch 128. The Peripheral Device 126, now in master mode, is electrically coupled to the AC '97 116 via the AC '97 bus 138. The switch 128 couples the Peripheral Device's second I/O interface 208 (FIG. 3) to the AC '97 bus 138.

Figure 5:
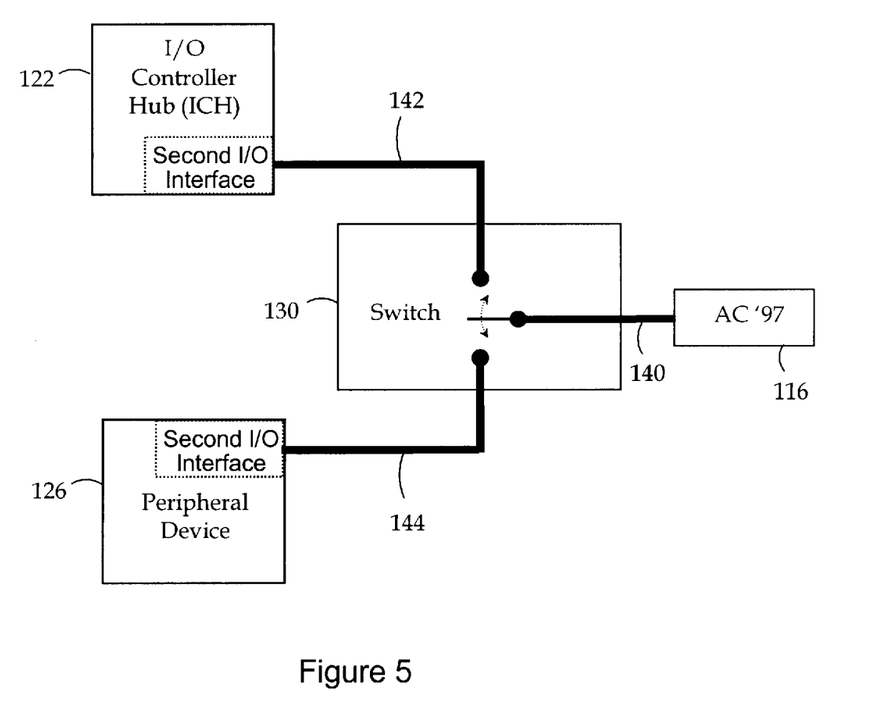
FIG. 5 is a system-level diagram illustrating in more detail the operation of the switch of FIG. 4.

FIG. 5 illustrates an alternative embodiment of the invention shown in FIG. 4. Rather than being a component internal to the second I/O interface of the Peripheral Device 126, the switch 130 may be an external component while still performing the same functions.

As with the switch 128 in FIG. 4, the switch 130 may comprise any switch or device which is capable of selectively and communicatively coupling a first node to one or more conductive nodes. In various embodiments of the present invention, the switch 130 may be a crossover switch, an A/B switch, a crossbar switch, or various other switches.

Thus, the switch 130 herein described may be designed in a number of ways without changing the character of the invention. In one embodiment of the invention, the function of the switch 130 may be performed by an integrated circuit device. Whatever embodiment the switch 130 may take, its purpose is the same, to electrically couple the AC '97 bus 140 to either the second I/O interface 208 (FIG. 4) of the Peripheral Device or the second interface of the ICH 122.

Figure 6:
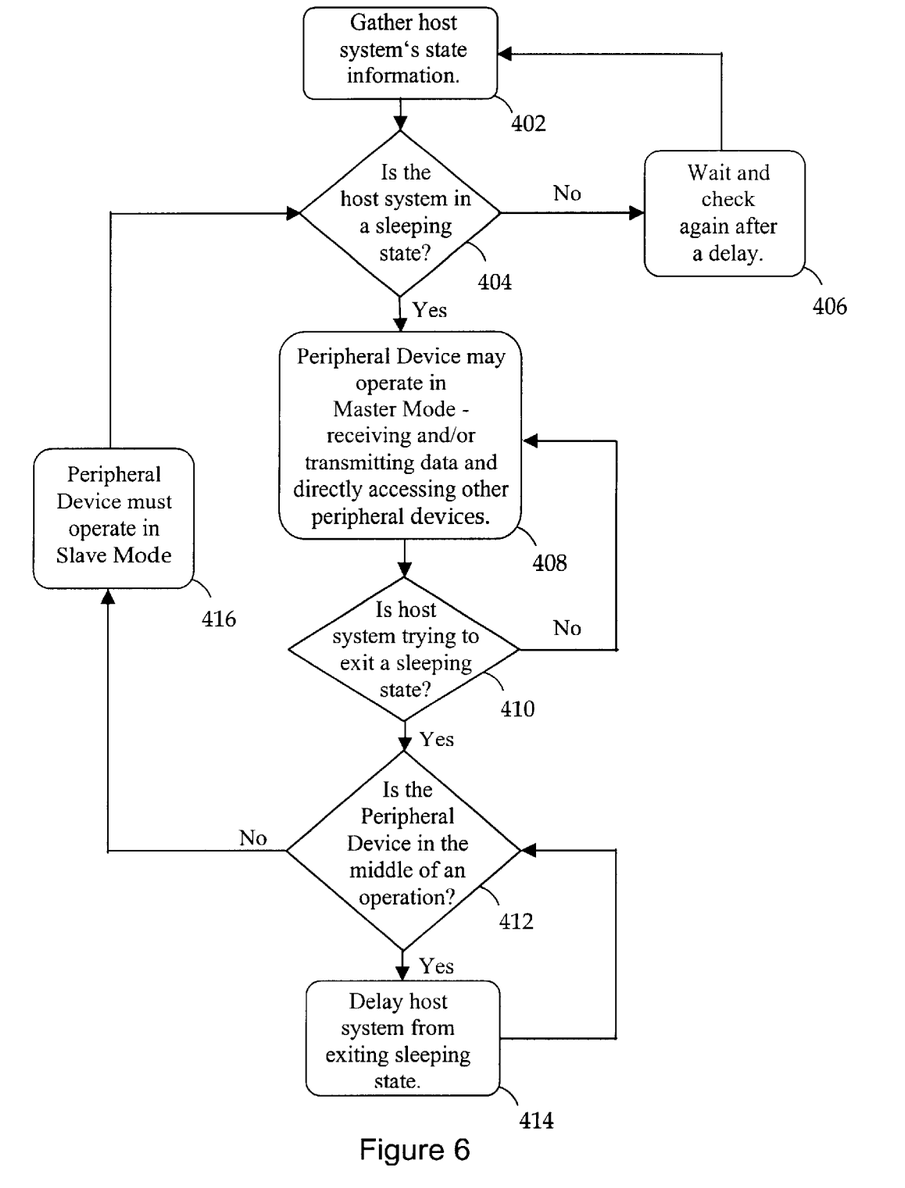
FIG. 6 is a high-level flowchart of the peripheral device's operation.

FIG. 6 is a high-level flowchart of the invention as has been described herein. This flowchart is intended to be exemplary of the way the present invention operates and variations upon these steps are possible and some have been described above, such as a power management function on the Peripheral Device 126.

The Peripheral Device 126, while in slave mode, detects the host system's, CPU's, or host computer's operating state 402. In one embodiment of the invention, the Peripheral Device 126 monitors the host system to determine its power management state. In an alternative embodiment of the present invention, power management state information may be sent to the Peripheral Device 126 by the host system or another hardware or software component.

The Peripheral Device 126 will then use the state information to determine if the host system is in certain sleeping states 404. Note that "certain sleeping states" is not inclusive of every sleeping state possible. Rather the term may be used to denote a subset of the possible sleeping states, such as ACPI sleeping states S2–S5 for instance. Thus, if the host system is in a non-sleeping state, such as S0–S2 for instance, then the Peripheral Device 126 will continue to operate as a normal I/O device until such time as the host system enters into a sleeping state, such as S3–S5.

When the host system enters certain sleeping states, the Peripheral Device 126 may change to master mode 408. In master mode, the Peripheral Device 126 may receive and/or transmit data and store or buffer it in locally attached memory 206 as described above. The Peripheral Device 126 may also be able to directly access other peripheral devices as described above.

While the Peripheral Device 126 operates in master mode, it can continue to monitor or detect the host system's operating state. In one embodiment, it may determine whether or not the host system or computer is trying to exit a sleeping state 410. In another embodiment, it may determine whether the host system continues to be in certain sleeping states. If the host system remains in certain sleeping states, the Peripheral Device 126 may continue to operate in master mode.

If the host system is awakening from certain sleeping states, the Peripheral Device 126 can determine if it is in the middle of an operation 412, such as reading or writing to another peripheral device. If it is not in the middle of such operation, it can return to slave mode 416 and the CPU 102 can awaken. However, if the Peripheral Device 126 is in the middle of an operation, it may delay the host system from awakening 414 until it has time to finish its operation. When the Peripheral Device 126 has finished, it can then return to slave mode 416 and the host system can awaken.

A person of ordinary skill in the art will recognize that the present invention may be practiced on other computer architectures than the ones described herein. While the preferred embodiment describes the Peripheral Device 126 as a device that may be mounted on the same motherboard as the host system or host computer's CPU 102, the Peripheral Device 126 may also be an external component not mounted on the motherboard. Moreover, although ACPI sleeping states were used to illustrate the operation of the Peripheral Device 126, the present invention may be practiced during other power management states where a computer's CPU 102 is placed in a suspended state.

While the invention has been described and illustrated in detail, it is to be clearly understood that this is intended by way of illustration and example only and is not to be taken by way of limitation, the spirit and scope of this invention being limited only by the terms of the following claims.

What is claimed is:

1. A device, comprising:
   a circuit to detect one of a first power management state and a second power management state of a central processor;
   a first interface to transfer data from the device to a second peripheral device through an I/O control hub (ICH) if the circuit detects the first power management state; and
   a second interface to directly transfer data from the device to the second peripheral device if the circuit detects the second power management state, in which the ICH provides no connection between the device and the second peripheral device.

2. The device of claim 1, wherein the second power management state includes power modes S3–S5 as defined in the Advanced Configuration and Power Interface (ACPI) specification.

3. The device of claim 1, wherein the first power management state and the second power management state each comprises a set of power management states.

4. The device of claim 1 wherein the second interface is a tri-state interface that is in a high impedance state if the circuit detects the first power management state.

5. The device of claim 1, further comprising a switch coupled to the second interface to route data according to the power management states.

6. The device of claim 1, wherein the second interface further couples the ICH to the second peripheral device if circuit detects the first power management state.

7. The device of claim 1, further comprising a third interface to receive data.

8. The device of claim 7, wherein the device buffers the data received if the central processor is in the second power management state.

9. The device of claim 7, further comprising a memory storage device coupled to the device to buffer the data received.

10. The device of claim 9, wherein data received from the third interface is transferred to the memory storage device by direct memory access.

11. A computer system comprising:
    a central processor having a first power management state and a second power management state;
    an I/O controller hub (ICH) coupled to the central processor, the ICH being functional only if the central processor is in the first power management state;

a second peripheral device coupled to the ICH; and a first peripheral device coupled to the ICH and to the second peripheral device, the first peripheral device having a circuit to detect one of the first power management state and the second power management state of the central processor, a first interface to route data from the device to the second peripheral device through the ICH if the circuit detects the first power management state, and a second interface to route data from the device directly to the second peripheral device if the circuit detects the second power management state, in which the ICH provides no connection between the device and the second peripheral device.

12. The computer system of claim 11, further comprising:

a tri-state bus to route data from the second peripheral device to the ICH if the circuit detects the first power management state, and to route data from the second peripheral device to the first peripheral device if the circuit detects the second power management state.

13. The computer system of claim 11, wherein the second interface is a tri-state interface that is in a high impedance state if the circuit detects the first power management state.

14. The computer system of claim 11, wherein the second peripheral device is an audio codec.

15. The computer system of claim 11, further comprising:

a switch to route data from the ICH to the second peripheral device if the circuit detects the first power management state, and to route data directly from the first peripheral device to the second peripheral device if the circuit detects the second power management state.

16. The computer system of claim 11, wherein the second power management state includes power management states S3–S5 as defined in the Advanced Configuration and Power Interface (ACPI) specification.

17. The computer system of claim 11, further comprising:

a memory controller hub coupled to the central processor;

wherein the ICH is coupled to the memory controller hub, to the first interface of the first peripheral device, and to the second peripheral device.

18. The computer system of claim 11, wherein the first peripheral device can delay the central processor from transitioning from the first power management state to the second power management state.

19. The computer system of claim 11, wherein the first peripheral device delays the central processor from transitioning from the second power management state to the first power management if the second interface is routing data from the device directly to the second peripheral device.

20. A device, comprising:

means for detecting the power management state of a central processor;

means for determining whether the central processor is in a first power management state or a second power management state;

means for transferring data from the device to a second peripheral device through, an I/O controller hub (ICH) if the first power management state is detected; and means for directly transferring data from the device the second peripheral device if the second power management state, in which the ICH provides no connection between the device and the second peripheral device, is detected.

21. The device system of claim 20, further comprising:

means for buffering data if the central processor is in the second power management state.

22. The device of claim 20, further comprising means for electrically isolating the first peripheral device from the central processor if the central processor is in the second power management state.

23. The device of claim 20, further comprising:

means for delaying the central processor from transitioning from the second power management state to the first power management state if the second interface is routing data from the device directly to the second peripheral device.

24. A method comprising:

detecting a power management state of a central processor;

determining whether the central processor is in a first power management state or a second power management state;

transfer data from a first peripheral device to a second peripheral device through an I/O controller hub (ICH) if the circuit detects the first power management state; and transferring data directly from the first peripheral device to the second peripheral device if the circuit detects the second power management state, in which the ICH provides no connection between the device and the second peripheral device.

25. The method of claim 24, wherein determining whether the central processor is in a first power management state or a second power management state occurs before receiving data.

26. The method of claim 24, wherein determining whether the central processor is in a first power management state or a second power management state occurs immediately before starting or delaying a data transfer.

27. The method of claim 24, wherein receiving data further comprises buffering the received data in a local memory of the second peripheral device.

28. The method of claim 27, further comprising:

delaying the central processor from exiting the second power management state if the second peripheral device is buffering data.

29. The method of claim 24, further comprising:

delaying the central processor from exiting the second power management state if the second peripheral device is communicating with the first peripheral device.

30. A machine-readable medium that provides instructions, which when executed by a processor, causes the processor to perform operations comprising:

detecting a power management state of a central processor;

determining whether the central processor is in a first power management state or a second power management state;

initiating a data transfer over a first I/O port from a first peripheral device to a second peripheral device through an I/O controller hub (ICH) if the central processor is in the first power management state; and initiating a data transfer over a second I/O port directly from the first peripheral device to the second peripheral device if the central processor is in the second power management state, in which the ICH provides no connection between the device and the second peripheral device.

31. The machine-readable medium of claim 30, wherein determining whether the central processor is in a first power management state or a second power management state occurs before receiving data.

32. The machine-readable medium of claim 30, wherein determining whether the central processor is in a first power management state or a second power management state occurs immediately before starting or delaying a data transfer.

33. The machine-readable medium of claim 30, wherein further providing instructions comprising:

delaying the data transfer by buffering the received data in a local memory of the first peripheral device.

34. The machine-readable medium of claim 30 further providing instructions comprising:

delaying the central processor from exiting the second power management state if the first peripheral device is buffering data.

35. The machine-readable medium of claim 30 further providing instructions comprising:

delaying the central processor from exiting the second power management state if the first peripheral device is communicating with the second peripheral device.

* * * * *

UNITED STATES PATENT AND TRADEMARK OFFICE
CERTIFICATE OF CORRECTION

PATENT NO. : 6,802,018 B2
DATED : October 5, 2004
INVENTOR(S) : Bormann et al.

It is certified that error appears in the above-identified patent and that said Letters Patent is hereby corrected as shown below:

Column 1,
Line 22, delete ":" and insert -- , --.

Column 9,
Line 60, after "device", insert -- to --.

Column 10,
Line 17, delete "transfer" and insert -- transferring --.

Signed and Sealed this

Twenty-first Day of June, 2005

JON W. DUDAS
*Director of the United States Patent and Trademark Office*